United States Patent [19]

Banchelin et al.

[11] Patent Number: 6,030,574
[45] Date of Patent: *Feb. 29, 2000

[54] PROCESS OF MANUFACTURING A GOLF CLUB SHAFT

[75] Inventors: Jean-Marc Banchelin, Annecy le Vieux; Philippe Renard, La Balme de Sillingy; Serge Solviche, Cran Gevrier, all of France

[73] Assignee: Taylor Made Golf Company, Inc., Carlsbad, Calif.

[*] Notice: This patent is subject to a terminal disclaimer.

[21] Appl. No.: 09/021,623

[22] Filed: Feb. 9, 1998

Related U.S. Application Data

[63] Continuation of application No. 08/774,079, Dec. 23, 1996, Pat. No. 5,814,268, which is a continuation-in-part of application No. 08/427,252, Apr. 24, 1995, abandoned, which is a continuation-in-part of application No. 08/035,316, May 11, 1993, abandoned, which is a continuation of application No. 07/802,546, Dec. 5, 1991, abandoned.

[30] Foreign Application Priority Data

Dec. 5, 1990 [FR] France .................................. 90 15387

[51] Int. Cl.⁷ ............................. B29C 49/00; B29C 70/44
[52] U.S. Cl. .................... 264/516; 156/156; 156/175; 156/191; 156/194; 156/285; 156/287; 264/257; 264/258; 264/314
[58] Field of Search ..................................... 264/257, 258, 264/314, 516; 156/156, 175, 191, 194, 285, 287

[56] References Cited

U.S. PATENT DOCUMENTS

| | | | |
|---|---|---|---|
| 3,755,037 | 8/1973 | Erwin et al. ...................... | 156/285 X |
| 4,202,856 | 5/1980 | Frikken et al. ..................... | 264/258 X |
| 4,397,048 | 8/1983 | Brown et al. ....................... | 264/258 X |
| 4,555,113 | 11/1985 | Shimazaki et al. ................. | 156/175 X |
| 4,876,049 | 10/1989 | Aoyama et al. .................... | 264/314 X |
| 4,931,247 | 6/1990 | Yeh ........................................ | 264/258 |
| 5,071,506 | 12/1991 | Nelson et al. ...................... | 156/156 X |

FOREIGN PATENT DOCUMENTS

| | | |
|---|---|---|
| 0040492 | 11/1981 | European Pat. Off. . |
| 2746173 | 4/1979 | Germany . |
| 51-34968 | 3/1976 | Japan . |
| 54-23627 | 8/1979 | Japan . |
| 57-98320 | 6/1982 | Japan . |
| 1312543 | 4/1973 | United Kingdom . |
| 1366773 | 9/1974 | United Kingdom . |
| 1446444 | 8/1976 | United Kingdom . |
| 1498892 | 1/1978 | United Kingdom . |
| 1554353 | 10/1979 | United Kingdom . |
| 2040790 | 9/1980 | United Kingdom . |
| 2085351 | 4/1982 | United Kingdom . |

*Primary Examiner*—Leo B. Tentoni
*Attorney, Agent, or Firm*—Greenblum & Bernstein, P.L.C.

[57] ABSTRACT

Process of manufacturing a golf club shaft made of composite materials, including the successive steps of fitting a tubular, flexible impermeable bladder around a rigid mandrel, dressing the mandrel with a composite structure including fibers impregnated with a synthetic resin matrix, placing the mandrel in the mold, and then carrying out a molding operation by applying at least one internal pressure exerted by feeding a fluid inside the bladder.

9 Claims, 5 Drawing Sheets

PROCESS OF MANUFACTURING A GOLF CLUB SHAFT

CROSS-REFERENCE TO RELATED APPLICATIONS

This application is a continuation of application Ser. No. 08/774,079, filed on Dec. 23, 1996, now U.S. Pat. No. 5,814,268, issued on Sep. 29, 1998, which is a continuation-in-part of application Ser. No. 08/427,252, filed on Apr. 24, 1995, now abandoned, which is a continuation-in-part of application Ser. No. 08/035,316, filed on May 11, 1993, now abandoned, which is a continuation of application Ser. No. 07/802,546, filed on Dec. 5, 1991, now abandoned. The priorities under 35 USC 120 of all of the aforementioned applications are hereby claimed and the disclosures of all of the aforementioned applications are hereby incorporated by reference thereto in their entireties.

This application also claims the priority under 35 USC 119 of French Application No. 90 15387, filed on Dec. 5, 1990, and the disclosure of which is also hereby incorporated by reference thereto in its entirety.

BACKGROUND OF THE INVENTION

1. Field of the Invention

The invention relates to the manufacture of golf club shafts and more specifically concerns a new process for the manufacture of shafts from composite materials and a device for implementation of this process, as well as the shaft thus manufactured.

2. Description of Background and Relevant Information

A process for the manufacture of tubular objects such as fishing rods and golf clubs made of resin reinforced with carbon or other fibers is described in British Patent No. 1,446,444 and U.S. Pat. No. 4,555,113.

The process involves winding, around a mandrel, sheets or layers of fibers pre-impregnated with epoxy resin, for example, then compressing this stack by taping using a thermoretractable polyester film. The mandrel covered in this way is then placed in an oven in order both to bake the composite covering and to cause compression of the covering around the mandrel through pressure exerted by the retraction of the film. Finally, after hardening of the resin, the mandrel and the tape are removed. Surface irregularities or traces left by the tape, commonly called steps, are abraded by grinding with emery during the shaft-finishing operation.

A variant of this procedure involves dressing the mandrel by filament winding using a yarn preliminarily impregnated with resin.

However, golfers, and especially top-level players, do not find these processes, which are very commonly used by manufacturers, entirely satisfactory, since they do not allow the mechanical properties to be reproduced from one shaft to another.

The substantial differences in the performances of these clubs, which are brought to light by professional golfers, result, in particular, from the removal of material during the required shaft-finishing operation.

Furthermore, these procedures appreciably restrict the opportunities for producing shafts having a complex shape, such as biconical shafts which may or may not incorporate reversed conicity of the areas of enlargement or narrowing, for example.

U.S. Pat. No. 3,755,037 discloses the manufacture of fiber-reinforced tennis or squash racquets and other curved articles. The composite structure of the racquet base is obtained from a tubular member which has a uniform section over its entire length and which is formed in a mold to provide an open oval or loop and spaced apart, parallel handle portions. The process uses an expansible casing which is impermeable to fluids. Pressures on the order of 50 to 100 psi are brought to bear by the fluid introduced inside the casing for expanding the casing and forcing the helical windings into contact with the walls of the mold.

The manufacture, of such structures having portions with complex shapes is obtained, according to the aforementioned process, by adding reinforcements or additional layers at the desired locations.

SUMMARY OF THE INVENTION

An object of the present invention is to propose a manufacturing process that is reproducible, easy to implement and that allows the production of shafts having a complex shape made of continuous layers of fiber sheets.

Another object of the invention is to make it possible, by means of the molding procedure, to produce a shaft having the proper finished state.

A further object of the invention is to manufacture shafts having complex shapes and homogeneous mechanical properties that prove difficult or impossible to produce using other techniques.

To this end, the invention is directed to a process for the manufacture of a golf club shaft from composite materials, including:

arranging an elongated bladder around a rigid mandrel, the bladder and the mandrel having respective generally tapered portions, such as frusto-conical portions, the tapered portion of the, mandrel having a first end and a lesser diameter second end, the bladder being arranged on the tapered portion of the mandrel, the bladder having a cross section decreasing in a direction from a first end toward a second end;

dressing the tapered portion of the mandrel with flexional and tensional fibers oriented as a function of desired shaft characteristics, the dressing of the mandrel providing a generally tapered fiber and resin structure;

placing the fiber and resin structure within a mold, the mold having an interior impression having at least one area of enlargement or narrowing; and carrying out a molding operation including applying, inside the bladder, fluid pressure and thereby forcing the fiber and resin structure against the interior impression of the mold, thereby conferring to the fiber and resin structure a shape, the shape including a counter-form of the at least one area of enlargement or narrowing, the shape being a final shape of the golf club shaft.

A particular feature of the invention is the use of an elongated, flexible bladder having a tapering shape for positioning over a mandrel which also has a tapering shape, so that the bladder adapts itself to the mandrel, thereby preventing the formation of folds and other irregularities. Merely for the purpose of creating complex shaft shapes, reinforcements and/or composite materials are not required.

The invention encompasses the production of the bladder. Specifically, according to a particular feature of the invention, the production of the elongated, flexible, impermeable bladder includes dipping an elongated template into a latex bath, the elongated template having a cross section decreasing in a direction from a first end toward a second end, to thereby form the bladder of latex.

According to an additional feature of the invention, the production of an elongated, flexible, impermeable bladder further includes, after the dipping of the template to form the latex bladder, heating the latex bladder at a predetermined temperature for a predetermined duration and, thereafter, cooling the latex bladder.

Preferably, according to the invention, the bladder has a thickness in a range of approximately 0.5 to 0.8 mm. Also, the internal pressure is exerted by compressed air preferably fed in a range of approximately 10 to 15 bars.

Still further, in a preferred embodiment, the mandrel is used as the template during the formation of the bladder so that the bladder is made in the shape of the mandrel.

BRIEF DESCRIPTION OF THE DRAWINGS

Other objects, advantages, and features of the invention will emerge more clearly from the description of an embodiment of the invention provided below with reference to the attached drawings, in which.

DETAILED DESCRIPTION OF THE INVENTION

Figure 1:
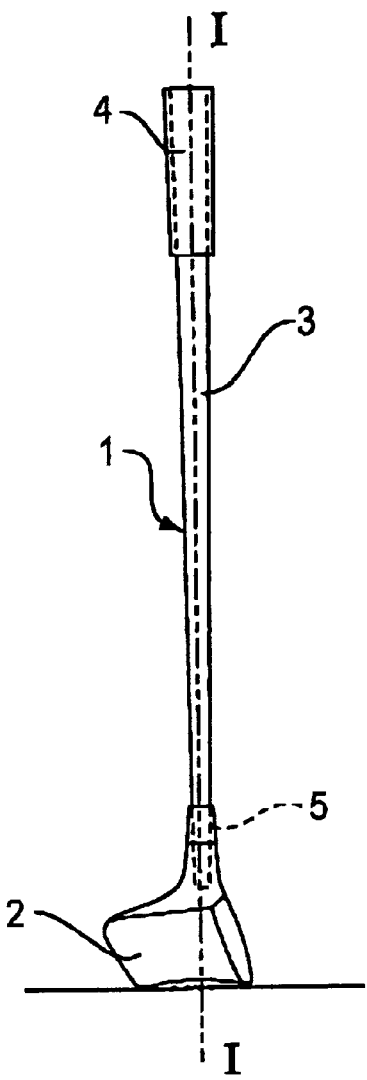
FIG. 1 shows a golf club on which a shaft manufactured by the process according to the invention is mounted.
Figure 2:
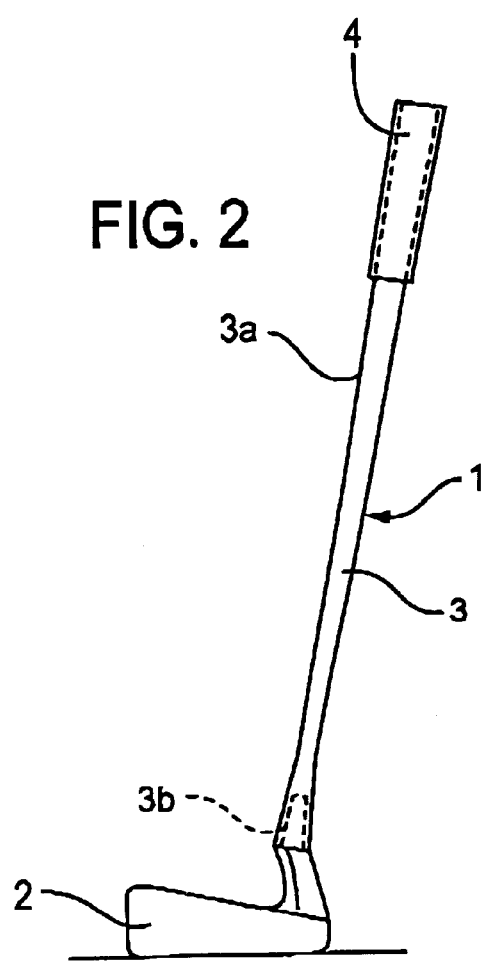
FIG. 2 shows a golf club on which another shaft manufactured by the process according to the invention is mounted.

As shown in FIG. 1, a golf club generally comprises a head 2, a shaft 3, a grip or handle 4, and possibly an intermediate part 5 termed "hosel" which acts mainly to strengthen the head/shaft connection. The shaft 3 is not a simple tube having a constant section, but, more generally, a tubular conical object whose largest section is located in the area of the handle 4. However, as shown in FIG. 2, in some cases, and especially as regards clubs called putters, the shaft 3 may comprise a small part 3b in whose lower section the conicity is reversed with respect to the main part 3a of the shaft. The shaft 3 according to the invention is made of composite materials, and in particular fibers immersed in a polymerized organic resin. Longitudinal flection stresses are essentially taken up by fibers arranged longitudinally along axis I of shaft 3, while torsion stresses are taken up by fibers wound in a substantially circumferential arrangement. The proportion of longitudinal fibers, whether wound or arranged at a specific angle with longitudinal axis I, are chosen according to the desired characteristics of the club.

The preferred embodiment of the inventive process is illustrated in FIGS. 3 to 8. It includes a first step involving the production of an elongated, flexible impermeable bladder 8 whose length is preferably at least equal to the length of the desired shaft, i.e., normally in excess of 1.0 m. The bladder has an open end and a closed end and a cross-section which decrees from adjacent the open end toward the closed end.

According to one important feature of the invention, bladders am made of an elastomer which must be employed by soaking to ensure the proper required shape. This technique is also known in other technical fields to those of ordinary skill in the art in the production of gloves, bladders, and thin rubber objects of complex shapes, and for which the main characteristics sought are pronounced stretching capacity and complete impermeability to gases and fluids. The elastomers that can be used within the scope of the invention include latex, neoprenes, or siliconized elastomers. Applicant prefers the use of a latex bladder.

Figure 3:
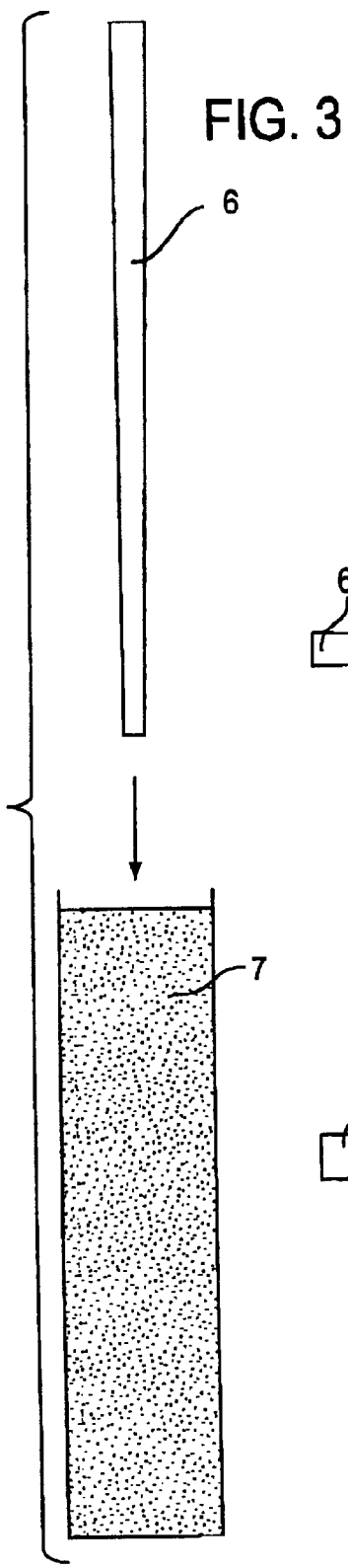
FIGS. 3 to 8 illustrate different steps of the process for manufacture of a shaft according to the invention.
Figure 4:
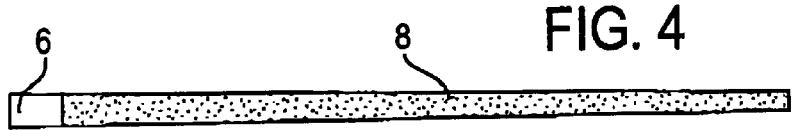

As shown in FIG. 3, use is made, to this end, of a part, or template, 6, which is immersed in a coagulating bath of calcium nitrate, for example, and then in a latex bath 7. After coagulation, the bladder 8 is baked for approximately 10 minutes at between 70 and 80° C. This technique makes it possible to obtain bladders having a thickness of less than 1.0 mm, preferably in the range of 0.5 to 0.8 mm. After cooling, the bladder is arranged on the rigid molding mandrel 9 having a shape substantially identical with the shape of the template and a length at least equal to that of the shaft to be produced. (The mandrel may be used as a template during the immersion step.)

Figure 5:
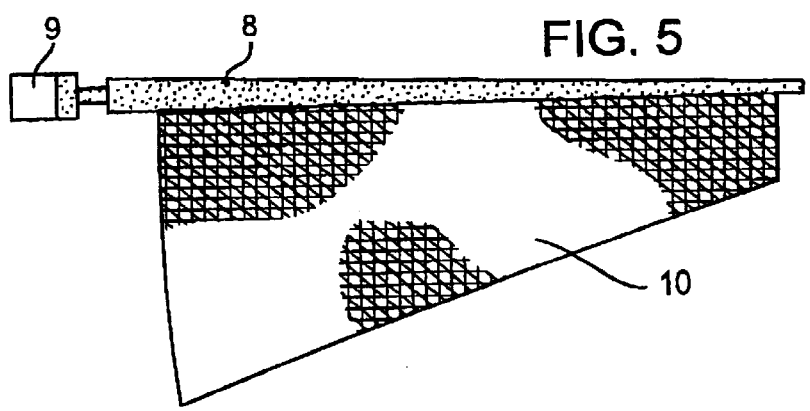

The following step, illustrated in FIG. 5, consists in dressing the mandrel with layers of fibers impregnated with an organic resin matrix to obtain a composite structure. The materials used within the scope of the invention are carbon fibers pre-impregnated with epoxy and made by the HEXCEL-GENIN company, e.g., of the T6T-135 or T6M-135 type. Of course, this procedure can be applied to shaft molding by using other fibers such as glass, ARAMID (Registered Trademark), or other fibers Dressing of the mandrel 9, on which the bladder is precisely fitted, is achieved by winding a continuous lay-up 10 of fiber sheets whose orientation depends on the characteristics desired. A truncated cone-like composite structure 11 formed from multiple layers of fiber sheets is thus obtained without any internal folds thanks to the precise correspondence of the respective shapes of the mandrel and bladder.

Figure 6:
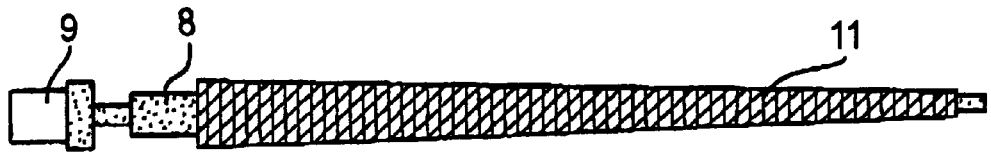

The mandrel 9 formed and illustrated in FIG. 6 is thus covered with a dressing 11 composed of a stack of from twelve to fifteen layers of pre-impregnated fibers.

Figure 7:
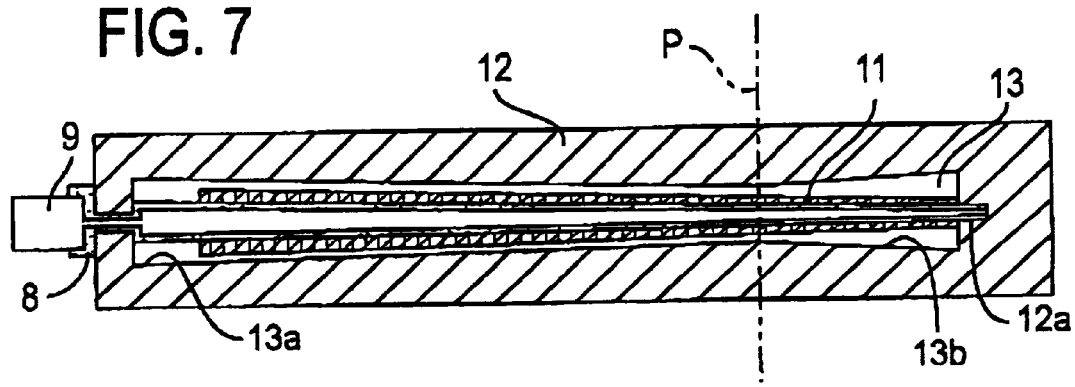
Figure 8:
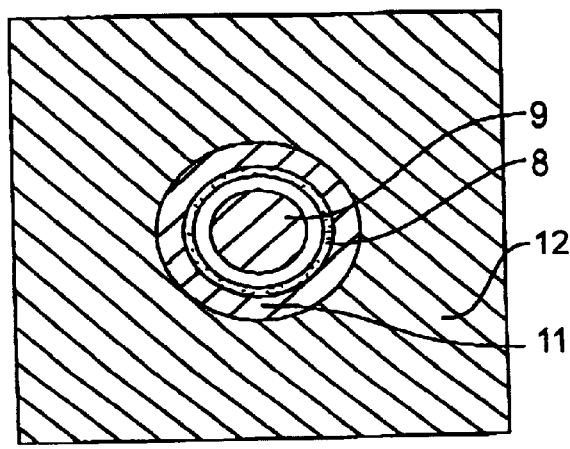

After dressing, at least a substantial portion of mandrel 9 is removed from the composite structure, and, as shown in FIGS. 7 to 8, the composite structure 11 and the portion of the mandrel 9 covered by the composite structure are then placed in a mold 12 whose impression 13 delimits the final shape of the shaft FIG. 7 shows an example of the invention in which the impression 13 comprises two zones 13a, 13b delimited by the plane P and whose conical shapes are reversed on either side of this plane. Generally speaking, the impression 13 may incorporate areas of enlargement or narrowing so as to produce, during molding, the counter-form of the area produced on the shaft in the desired locations. The inventive process makes possible the use of a single conical mandrel for molding shafts of various shapes. This capability is very advantageous both from a technical standpoint, since the manufacture of shafts of complex shapes from steel is a difficult operation, and from an economic standpoint, since one mandrel shape can be adapted to many different mold shapes.

It may be advantageous to form a cavity or centering shoulder 12a at the end of the mold 12 opposite the end used to insert a part of the mandrel 9 whose end is not completely covered by the bladder 8.

The molding operation is conducted by heating the mold and by applying at least one internal pressure, e.g., in the range of 10 to 15 bars, exerted by the feed of a gas inside of the flexible bladder 8 through its open end, in order to force the composite structure 11 against the impression 13 of the mold 12. The molding cycle varies according to the nature and reactivity of the pre-impregnated materials used. By way of example, for pre-impregnated epoxy materials the mold is heated to 150° C., then cooled to ambient temperature. Heating and cooling times arm 15 and 10 minutes, respectively. Pressurization takes place at from 40 to 50° C. during the heating phase and is kept stabilized until the end of the molding cycle.

FIG. 8 shows the arrangement of components at the periphery of the mandrel after injection of a compressed fluid, such as compressed air, inside the bladder. After opening the mold, the mandrel can be easily removed without special tools simply because of the space created by compression and formed between the mandrel 9 and the bladder 8, which is encased by the composite structure 11.

Figure 9:
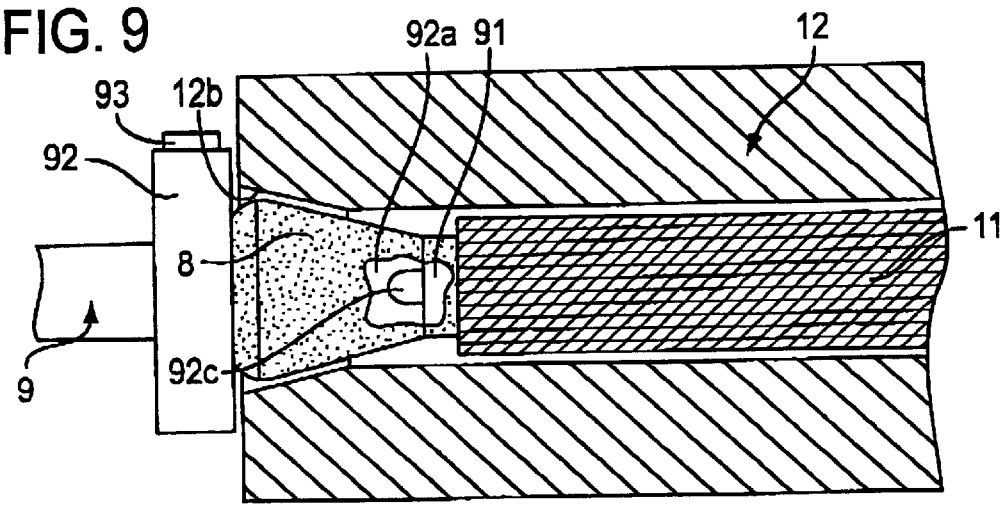
FIG. 9 is a partial detailed view of the molding device for implementation of the process.
Figure 10:
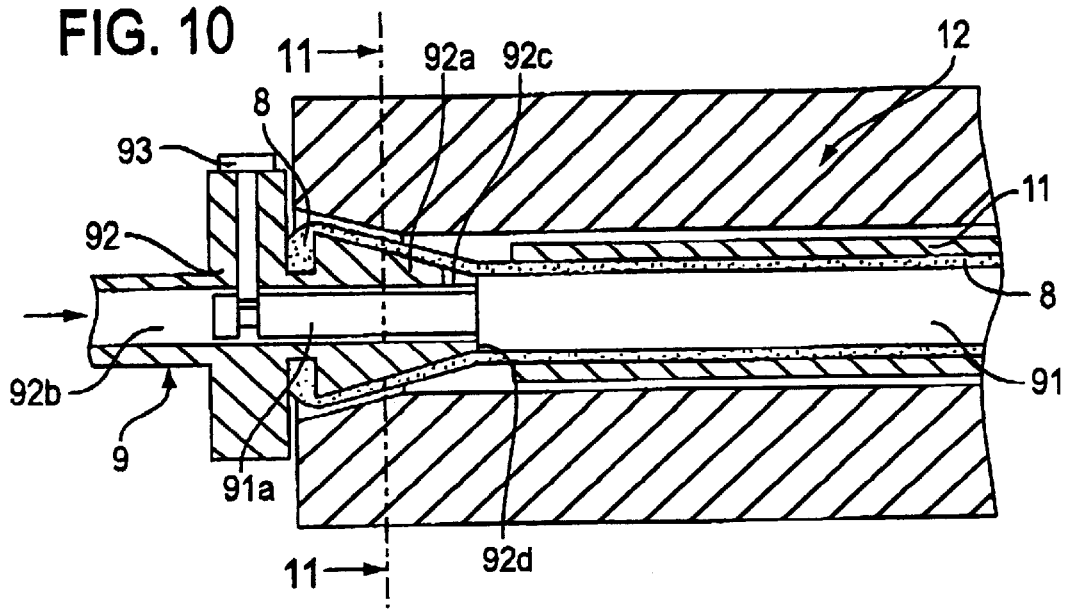
FIG. 10 is a detailed cross-section view of the device shown in FIG. 9.
Figure 11:
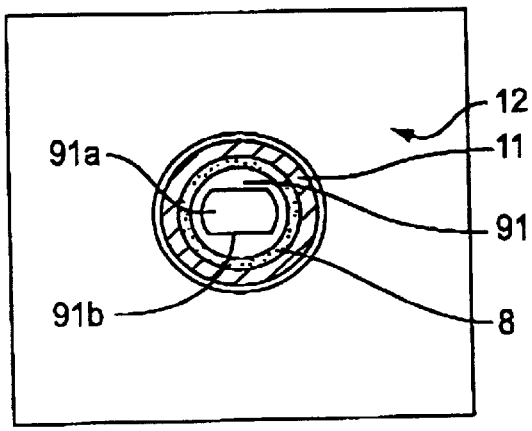
FIG. 11 is a partial cross-section of FIG. 10 along line 11—11 of this same device.

FIGS. 9 to 11 show a special embodiment of the gas feed and of the impermeability system of the mold. The mandrel 9 is constituted by two elements 91 and 92 which are partially inserted into each other, of which one is a secondary compressed fluid-feed element mounted on the other principal conical element 91, which supports the composite structure 11. The secondary element 92 provides impermeability of the bladder 8 by being wedged against the surface of revolution 12b having a shape complementary to the inlet of the mold 12. To this end, the edges of the bladder 8 extend beyond the principal conical element 91 of the mandrel 9 and the bladder covers the front tubular pan 92a, fitting into the mold 12 and in the shape of a truncated cone of the secondary element 92, the edges 92d of the small base being pressed against the end of the large base of the principal conical element 91. The bladder is wedged between the surface of the conical part 92a of the secondary element 92 and the inner walls 12b of the mold 12.

An axial bore 92b connected to the external gas supply passes through the secondary element 92 as mounted. The compressed fluid feed inside the bladder 8 takes place through one or more feed orifices 92c, which are preferably produced on the edges 92d of the small base of the conical part 92a of the secondary element 92, as shown in FIGS. 9 and 10.

The principal element 91 is advantageously extended by an axial positioning dog 91a extending into the bore of the secondary element 92. This positioning dog 91a preferably comprises one or more flat surfaces 91b making possible the passage of the fluid through the bore of the secondary mounted element 92. Finally, the principal element 91 may be connected inside the secondary element 92 by using a pin 93 or by any other means.

Figure 12:
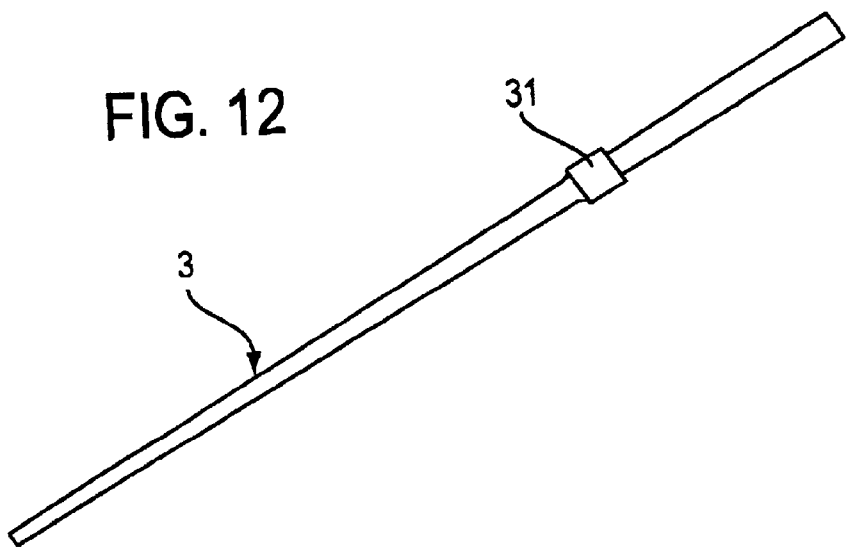
FIGS. 12 and 13 illustrate examples of shafts produced in accordance with the invention.
Figure 13:
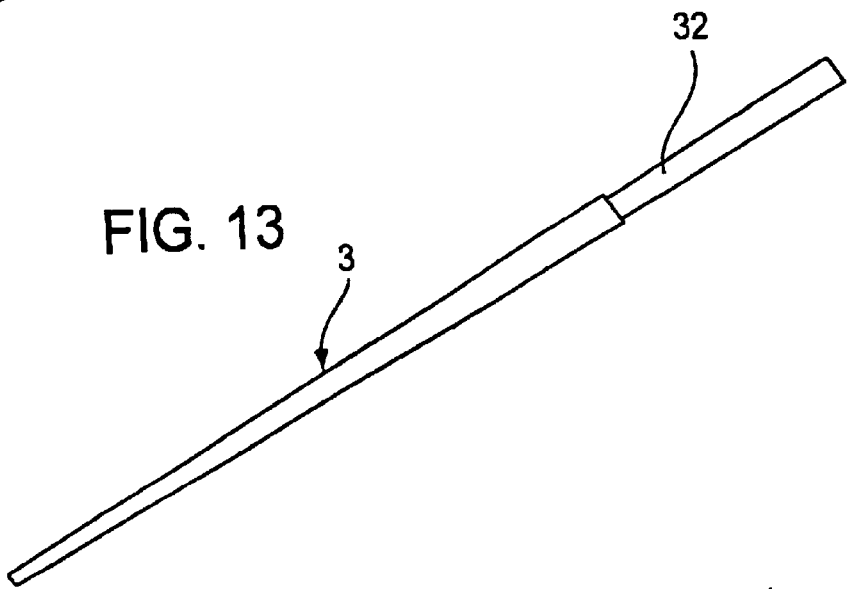

FIGS. 12 and 13 illustrate tubular, slightly conical shafts produced according to the invention. The invention makes it possible to create zones of enlargement 31 or narrowing 32 while preserving the continuity of the layers of fiber sheets in these transition areas, thereby conferring homogeneity of the mechanical properties along the shaft, and thus, effective reproducibility of these properties from one shaft to another. A proper finished state requiring no reworking is also obtained.

These areas are, in particular, formed at various locations depending on the club, so as to delineate a specific deformation profile, or in order to shift the moment of inertia of the club without adding weight, for example.

Finally, these areas can also be used for the incorporation of a handle or grip flush with the surface of the club, e.g., when the shaft is narrowed, as shown in FIG. 13. The space created by the narrowing of the shaft can be filled with a plastic or metal ring. Depending on the nature and properties of the material used, this ring can contribute to the dampening or balancing of the club.

Figure 14:
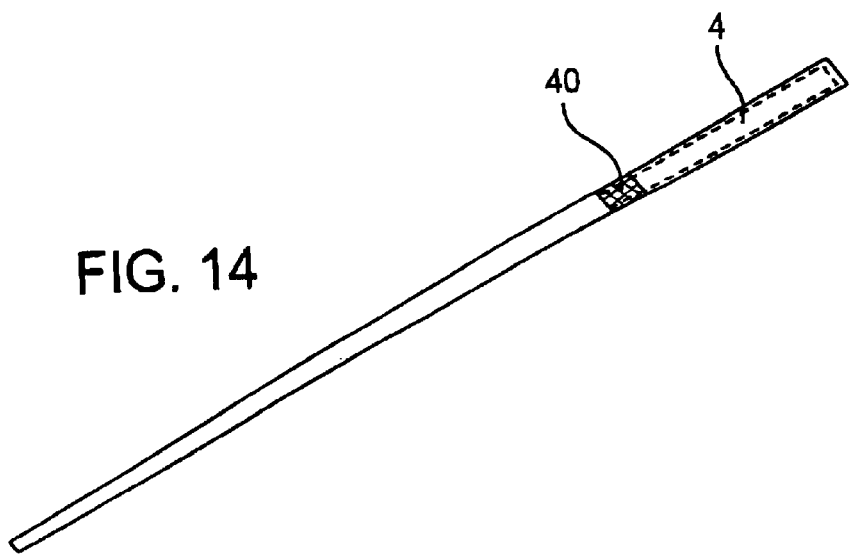
FIG. 14 shows an example of the shaft in FIG. 13, incorporating a handle and filling ring.

FIG. 14 illustrates an example of a shaft 3 fitted with a narrowed zone 32, which is covered by a ring 40 and an incorporated grip 4 adjacent to the ring. The ring 40 may be metal weight or a dampening element made, for example, of a viscoelastic material.

An enlarged area of the shaft may serve as an element used for aiming, marking, etc.

What Is claimed is:

1. A process for the manufacture of a golf club shaft made of a fiber and resin material, said process comprising:

arranging an elongated bladder around a rigid mandrel, said bladder and said mandrel having respective generally tapered portions, said tapered portion of said mandrel having a first end and a second, lesser diameter, end, said bladder being arranged on said tapered portion of said mandrel;

dressing said tapered portion of said mandrel with flexional and tensional fibers oriented as a function of desired shaft characteristics, said dressing of said mandrel providing a generally tapered fiber and resin structure;

placing said fiber and resin structure within a mold, said mold having an interior impression having at least one area of enlargement or narrowing; and carrying out a molding operation comprising applying, inside said bladder, fluid pressure and thereby forcing said fiber and resin structure against said interior impression of said mold, thereby conferring to said fiber and resin structure a shape, said shape including a counterform of said at least one area of enlargement or narrowing, said shape being a final shape of said golf club shaft.

2. A process for the manufacture of a golf club shaft according to claim 1, further comprising:

before said arranging a bladder around a rigid mandrel, producing the bladder from a material being flexible and impermeable, the bladder having a first end and a second end, said bladder having a cross section decreasing in a direction from said first end toward said second end.

3. A process for the manufacture of a golf club shaft according to claim 1, wherein:

said tapered portion of said mandrel is a frusto-conical portion, whereby said dressing of said mandrel provides a generally frusto-conical fiber and resin structure.

4. A process for the manufacture of a golf club shaft according to claim 2, wherein:

said producing the bladder comprises dipping an elongated template into a latex bath, said elongated template having a cross section decreasing in a direction from a first end toward a second end, to thereby form said bladder of latex.

5. A process for the manufacture of a golf club shaft according to claim 4, wherein:

said producing an elongated, flexible, impermeable bladder further comprises, after said dipping, heating said latex at a predetermined temperature for a predetermined duration and, thereafter, cooling said latex.

6. A process for the manufacture of a golf club shaft according to claim 1, wherein:

said arranging an elongated bladder around a rigid mandrel comprises arranging an elongated bladder having a thickness in a range of approximately 0.5 to 0.8 millimeters around a rigid mandrel.

7. A process for the manufacture of a golf club shaft according to claim 1, wherein:

said applying fluid pressure comprises applying fluid pressure by compressed air fed in a range of approximately 10 to 15 bars.

8. A process for the manufacture of a golf club shaft according to claim 1, wherein:

after said placing said fiber and resin structure within a mold and before said carrying out a molding operation: removing at least a substantial portion of said mandrel from said fiber and resin structure.

9. A process for the manufacture of a golf club shaft according to claim 4, wherein:

said mandrel is used as a template, during the dipping of the template into a latex bath, to form said bladder to have a shape of said mandrel.

* * * * *